April 30, 1963 HISASHI KANEKO 3,087,996

MULTIPLEX PULSE CODE MODULATION SYSTEM

Filed Feb. 8, 1961 2 Sheets-Sheet 1

Inventor
H. Kaneko
By [signature]
Attorney

Inventor
H. Kaneko
By [signature]
Attorney 3,087,996
Patented Apr. 30, 1963

3,087,996

MULTIPLEX PULSE CODE MODULATION SYSTEM

Hisashi Kaneko, Tokyo, Japan, assignor to Nippon Electric Company Limited, Tokyo, Japan, a corporation of Japan Filed Feb. 8, 1961, Ser. No. 87,871
Claims priority, application Japan Feb. 12, 1960
1 Claim. (Cl. 179—15)

Figure 1:
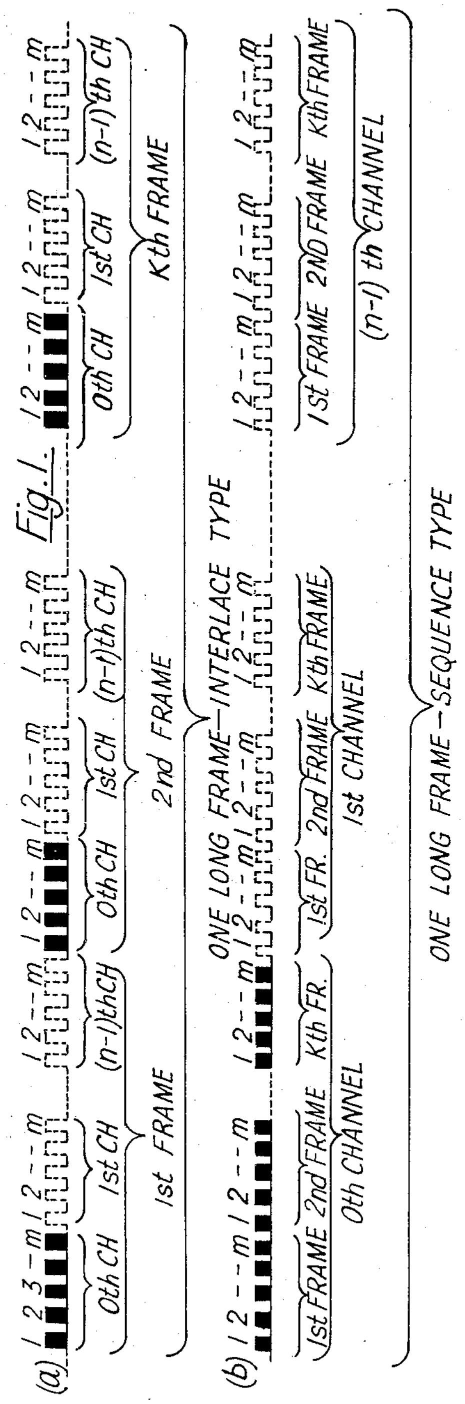

This invention relates in general to a multiplex pulse code modulation system and in particular to an improved arrangement for synchronizing such systems. Its principal object is to provide an improved synchronizing circuit arrangement for systems of the above character, which in the event of the collapse of synchronism, considerably reduces the synchronizing recovery time.

In known synchronizing arrangements for time-division multiplex systems, the synchronizing pulses may be uniformly distributed in one frame of pulse code sequences or may be arranged at the beginning of each frame of pulse code sequences. The first type of synchronization is commonly termed the interlace synchronizing system and the latter type is commonly termed the sequence synchronizing system. A description of these two types of synchronizing systems and the manner in which they are synchronized after a collapse of synchronization is given in my copending application, Serial No. 50,628, filed August 19, 1960. In the above application, synchronism recovery, after collapse of synchronism, is accomplished by shifting the relative time positions between the sending and receiving terminal stations of the multiplex system bit-by-bit until the two terminal stations are again synchronized. As described in my later copending application, Serial No. 61,933, filed October 11, 1960, the recovery time of synchronism in a sequence-type synchronizing system can be decreased by shifting the timing between the sending and receiving terminal stations of the multiplex system a variable number of bits. This is accomplished by resetting the timing and control apparatus to zero position each time the synchronism collapses. In both of the noted applications, the synchronizing code is composed of a series of mark and space pulses, which code is arbitrarily set at both the sending and receiving terminals of the multiplex system.

It has been found that the recovery time of synchronism between the sending and receiving terminals of a multiplex system can be further reduced by utilizing a special synchronizing code, such as a code composed of all mark or all space pulse conditions. Such an arrangement is shown and described in a later one of my copending applications, Serial No. 87,445, filed February 6, 1961.

In all of the applications above referred to, wherein a reset type sequence system is disclosed, the synchronism restoring time finally converges to one frame length.

According to the present invention, the recovery time of synchronism between the sending and receiving terminals of a multiplex system can be reduced still further by combining several pulse frames into one long frame of pulses. It is therefore an object of this invention to provide an apparatus for use with a plurality of frame of pulse code modulation pulses which reduces the recovery time of synchronism of time-division multiplex systems over that presently known.

It is another object of the invention to provide a synchronizing system which affords stable characteristics against interference due to a noise or to an instantaneous break in transmission.

Figure 2:
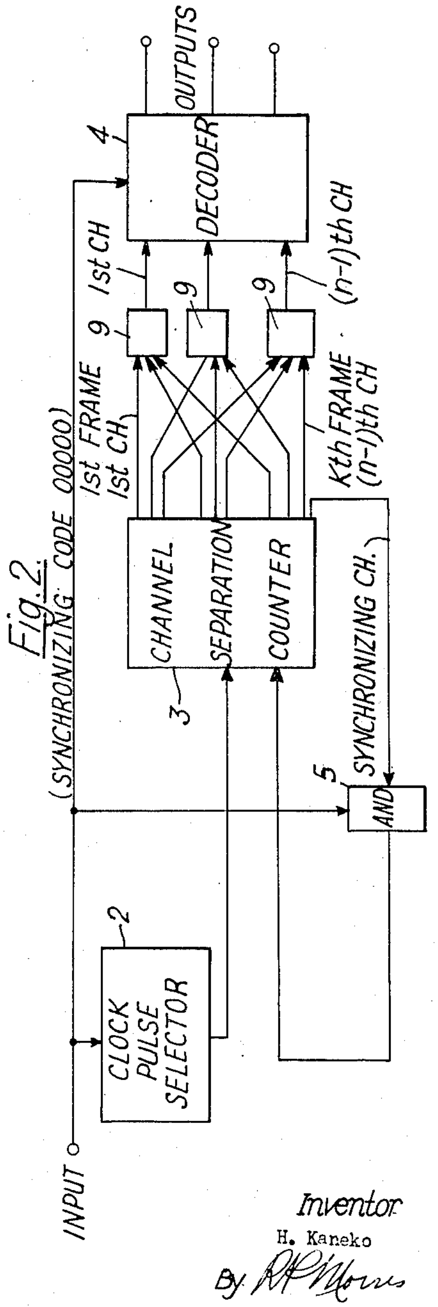
Figure 3:
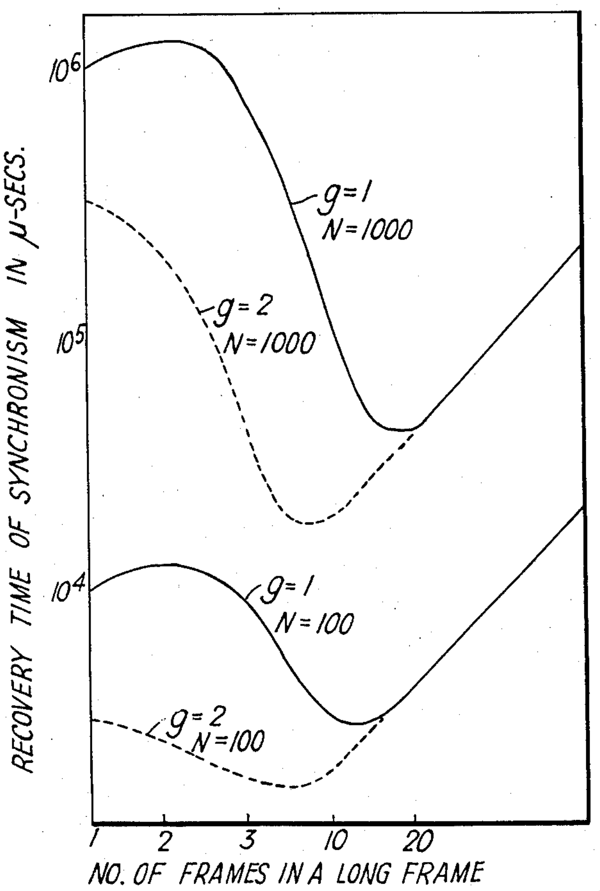

Other objects and features of the invention and the manner of obtaining them will become apparent and the invention will be best understood by reference to the following description of an embodiment of the invention taken in conjunction with the accompanying drawings comprising FIGS. 1 to 3, wherein:

FIG. 1, parts *a* and *b*, discloses respectively code pulse waveforms of a plurality of frames of combined synchronizing code sequences and signalling codes sequences and code pulse waveforms of one long frame of combined synchronizing and signalling code pulse sequences wherein the long frame is composed of a plurality of regular frames of pulses rearranged according to a predetermined pattern;

FIG. 2 discloses a schematic block diagram of a receiving station equipment for use with the long frame of coded pulses; and FIG. 3 shows a graphical representation of the recovery time of synchronism when various arrangements of long frame coded pulses are utilized with the apparatus of FIG. 2.

In FIG. 1 of the drawings, the pulses indicated by solid lines are synchronizing pulses while the pulses indicated by broken lines are signalling pulses. The solid-line pulses which are filled in are mark pulses while those left blank are space pulses. The broken-line pulses are not shown as mark and space pulses but they are assumed to be a series of mark-space sequences.

Now let it be assumed that $q$ synchronizing pulses are contained in an $m$-digit, $n$-channel multiplex pulse sequence. In such a case when $q$ is equal to $m$, there are $n-1$ speech channels and when $q$ is smaller than $m$, the Nth speech channel may comprise $m-q$ digits.

If the number of synchronizing pulses in one frame is $q$, then for $q=1$, the interlace and the reset sequence system each have the same synchronism restoration characteristics. If $q$ is greater than 1, the interlace or one-bit shift system has a restoring time whose expected value decreases approximately inversely proportional to the value of $q$ while in the reset system where $q$ is greater than 1, the noted restoring time decreases exponentially as the number $q$ increases since the probability of discovering an error is proportional to $p^{q-1}\cdot(1-p)$ where $p$ is the probability of non-discovery of an error and is approximately one-half.

In case of the reset type sequence system the synchronism restoring time finally converges to one frame length, which is the minimum time required for restoring synchronism, for any type of system; further increase of the number $q$ will not shorten the restoring time. Generally speaking, in the reset type sequence system whose number N of pulses per frame is large, when the number $q$ is small, the restoring time is approximately proportional to $N^2$, because a time proportional to N is required before an error discovery and because N shifts are necessary. When $q$ is moderately large, the restoring time is approximately proportional to N, because an error discovery is made almost always within $q$ synchronizing pulses and because the time required for the restoration is nearly equal to that for N shifts. In the interlace or one-bit shift systems if N is increased, the restoring time will increase approximately proportionally to $N^2$. If $q$ is increased proportionally to N, that is, if N is increased so that the ratio of the synchronizing pulses to the total pulse sequence $q/N$ is kept constant, the restoring time will remain approximately proportional to N.

The system of this invention improves the synchronism restoring characteristics of the multiplex PCM communication by utilizing the fact that the restoring time characteristics of the one-bit shift system differ from those for the reset type sequence system.

Referring to FIG. 1($a$) wherein the pulse code sequence contains $q$ synchronizing pulses in N pulses of one frame, the reset type sequence system has better restoration characteristics, as has been described, so far as this frame is concerned. It will be seen furthermore that a longer frame comprises $k$ successive frames which contains $k \times N$ pulses and $k \times q$ synchronizing pulses in a manner of the interlaced arrangement. This invention is characterized by arranging these $k \times q$ synchronizing pulses in one group in a longer frame, as shown in FIG. 1(*b*). If the reset type sequence system is used, the restoring time is further shortened, and it is obvious that a remarkable improvement can be made by increasing the value of $k$. It is to be noted, however, that if the number $k \times q$ of the synchonizing pulses in the longer frame is made approximately to ten or larger, the improvement of the restoration characteristics due to an increase of the number $k \times q$ will saturate and the restoring time is instead increased due to the increase of the number of the states which are equal to $k \times N$ and are necessary for the restoration process. Therefore, there must be an optimum value of $k$ which makes the restoring time minimum with a constant ratio of the number of synchronizing pulses to the total pulses in a frame $q/N$.

FIG. 3 shows a few examples of these tendencies. That is, with $N=100$, if a longer frame is formed of $k$ frames in each of which $q=1$ and if all synchronizing pulses in the longer frame are gathered into one group, the restoring time will nevertheless not be decreased when $k=1$ or 2 but will become minimum when $k=10$, and will increase approximately proportionally to the number $k$ with further increase of the number $k$, becoming longer than that at $k=1$ with too much increase of the number $k$ so that the merits of a longer frame are lost. This means that, in this example, grouping about ten frames into one longer frame will give the best restoration characteristic. The same applies with the case of $q=2$.

Further increase of the length of or the number of N of pulses in one frame will make this effect more remarkable. With $N=1{,}000$ and $q=1$, for example, the restoring time is reduced to $1/20$ and very excellent synchronism restoration characteristic is obtained when about sixteen frames are grouped into one longer frame having the frames length $kN=16{,}000$ and synchronizing pulses $kq=16$.

Collapse of the synchronism of a frame is caused, if there is no misoperation of the equipment, by noises picked up chiefly by the transmission channel, by an instantaneous break of the channel, and by distortion of the bit rate synchronism. The probability of occurrence of these causes, however, is usually very small. In such a digital system, if a synchronizing pulse is mistransmitted, synchronism is broken without fail at the receiving terminal. Especially, if an instantaneous circuit break of a short duration occurs in an interlace system or a sequence system having short or ordinary frame construction, there is a large possibility of stepping out of synchronism, because the synchronizing pulse sequence is distributed equally-spaced in the frame. On the other hand, in the system of this invention having a longer frame construction wherein synchronizing pulses are successively grouped only in one place of the longer frame, the probability is reduced in which synchronism goes out of step due to an instantaneous break of a short duration as compared with the length of the longer frame. The system of this invention gives a synchronizing system which affords stable characteristics against the interference due to a noise or an instantaneous break.

Although the circuit construction of this invention is not so much complicated compared with that of an ordinary reset type sequence system, in principle it is necessary to increase the capacity of the channel separator to a value equivalent to $k$N according to longer frame construction, and to obtain the channel separating pulses for the channels by collecting the respective channel separating pulses of each frame in the longer frame and by figuring out their logical sum.

FIG. 2 shows a system diagram of a receiving terminal embodying the features of this invention. It has been chosen to disclose apparatus for use with a synchronizing code sequence of all-space pulses (00000) since this apparatus is considerably simplified over that apparatus used with the synchronizing code (11111) illustrated in FIGS. 1(*a*) and (*b*). Any of the reset-type systems disclosed in my prior copending applications could be used with the long-frame arrangement of the present invention.

The multiplex code pulse sequence transmitted from the sending terminal and received on the input terminal 1, goes to a decoder 4 from which for each channel a demodulated output is obtained, and also goes to a clock pulses selector 2 which in turn advances a channel separating counter 3. The function of the clock pulses selector 2 is to form pulses which occur at the fundamental pulse repetition frequency of the intelligence and sync channels. The AND gate 5 compares the synchronizing code pattern generated by the synchronizing channel separating pulses and the code sequence selected out of the received pulse sequence at the same synchronizing pulse time points, and resets the channel separating counter 3 to the zero position if an error is found by the comparison, thereafter repeating this operation step by step until the synchronism is restored. The channel separating counter 3 has $kn$ output terminals, or output terminals of $k$ times the number of channels $n$. The logical sums of these channel separating pulses are obtained by well-known logical combining circuits 9 for each channel in the frames in a longer frame. The output of each of the logical combining circuits 9 is the channel separating pulses of the particular channel. By these pulses it is possible, through the decoder 4, to obtain the demodulated output of that channel at the corresponding output terminal. As for the synchronizing channel separating pulses, inasmuch as the synchronizing pulses of each frame in the longer frame are successively trained in one group in order to adapt them to the reset type sequence system, the synchronizing channel selecting pulses are derived from the corresponding position of the channel separating counter 3.

Due to such a construction of the sychronizing pulse sequence, there will occur such a case in which codes of some sampling time points in a channel are occupied by synchronizing pulse sequence. The effect of such occupation, however, can be made practically negligible, in case of voice transmission, data transmission, and the like, by the well-known method, for instance, by interpolating, after the channels are separated from one another, with the value at the previous sampling time point. Furthermore, such may not be required at all depending upon the code composition of the channels. The circuit construction of FIG. 2 may further be simplified by the well-known method.

As explained hereinbefore in detail, the synchronizing system in the multiplex code modulation system of this invention gives the excellent synchronism restoring characteristics by grouping a proper number of multiplex PCM channels of a frame, into a longer frame, by grouping, the synchronizing pulses of the smaller frames at a predetermined place in the longer frame, and by applying thereto the reset type sequence synchronizing method. Thus it is applicable not only to the PCM multiplex transmission channels but also to the multiplex information transmission processing system, providing a very wide application effect.

While I have described above the principles of my invention in connection with specific apparatus, it is to be clearly understood that this description is made only by way of example and not as a limitation to the scope of my invention as set forth in the objects thereof and in the accompanying claim.

What is claimed is:

In a synchronizing circuit arrangement for a time division multiplex system employing pulse code modulation and including a number of signalling channels and a synchronizing channel, said channels making up one frame, and comprising: an input terminal for receiving both the signalling code pulses of the signalling channels and the synchronizing code pulses; a channel separator, having a plurality of signal channel outputs and a synchronizing channel output; a decoder coupled between said input and the signal channel outputs of said channel separator for demodulating the channel signals; means connected to said input for generating a train of clock pulses coincident with, and having a recurrent frequency equal to, the fundamental repetition frequency component of the received wave; means for triggering said channel separator with said clock pulses; a logic circuit connected to said input terminal and said synchronizing channel output of said channel separator for gating the received code pulses with the synchronizing channel output, whereby said logic circuit provides indicia which may be used to determine an error in synchronization for resetting the channel separator to the zero pulse position of the synchronizing code sequence: the improvement therein; when K of said frames are arranged in a long frame in which all of the synchronizing pulses are arranged in one group therein and said channel separator has K*n* signal channel outputs, where *n* is the number of signalling channels; comprising *n* combining circuits connected between said decoder and said channel separator, each said combining circuits being connected on its input to K channel separator outputs.

References Cited in the file of this patent

UNITED STATES PATENTS 2,949,503 Andrews et al. ---------- Aug. 19, 1960